Aug. 20, 1940.   E. R. PIERCE ET AL   2,212,246
HYDRAULIC BRAKE WHEEL CYLINDER
Filed May 12, 1938    2 Sheets-Sheet 1

Inventors
Earl R. Pierce &
Gilbert K. Hause
By
Blackmore, Spencer & Hirt
Attorneys Aug. 20, 1940.   E. R. PIERCE ET AL   2,212,246
HYDRAULIC BRAKE WHEEL CYLINDER
Filed May 12, 1938   2 Sheets-Sheet 2

Inventors
Earl R. Pierce &
Gilbert K. Hause
By
Attorneys

Patented Aug. 20, 1940

2,212,246

UNITED STATES PATENT OFFICE 2,212,246

HYDRAULIC BRAKE WHEEL CYLINDER

Earl R. Pierce and Gilbert K. Hause, Dayton, Ohio, assignors to General Motors Corporation, Detroit, Mich., a corporation of Delaware Application May 12, 1938, Serial No. 207,616

5 Claims. (Cl. 60—54.6)

This invention relates to hydraulic motors and has been designed especially to serve as a wheel cylinder in a hydraulic brake system.

An object of the invention is to so make a wheel cylinder that an improved seal is obtained to prevent leakage.

Another and more specific object is to prevent leakage by the use of a sealing diaphragm of flexible incompressible material.

Still another object is to provide an exceedingly simple construction for securing such a seal or diaphragm in place.

Other objects such as efficiency in operation and economy in manufacture will be understood from the following description.

Figure 1:
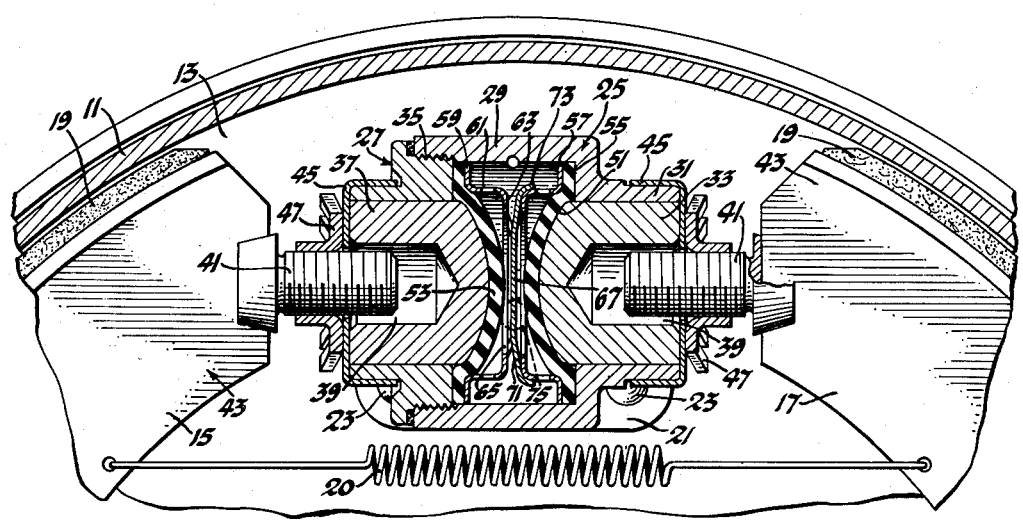
Figure 1 is a vertical section through one embodiment of the invention.
Figure 2:
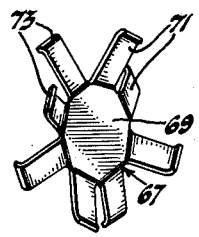
Figure 2 is a perspective of a detail.

Referring to Figures 1 and 2, numeral 11 represents a conventional brake drum, such a drum as is usually mounted on vehicle wheels. As is customary the drum is closed by a cover plate 13, this plate being carried by the dead axle or other non-rotating part. The drawing shows two shoes 15 and 17 which are suitably assembled to frictionally engage the drum, there being provided suitable lining material 19. The anchorage of the shoes to the backing plate may be conventional and is not shown. Normally the shoes are retracted from engagement with the drum by a spring 20 terminally connected to the shoes as shown.

The wheel cylinder is formed with a face portion 21 having apertures for the passage of fastening means 23 connected to the cover plate 13. The cylinder consists of two parts 25 and 27. Part 25 has an enlarged diameter portion 29 and a reduced end 31. A piston 33 slides through the reduced end 31. Part 27 is threaded at 35 into the enlarged part 29 and its inner diameter corresponds with the inner diameter of part 31. Reciprocable within part 27 is a second piston 37. The pistons 33 and 37 have axial recesses 39 into which freely project the ends of threaded stems 41, the other end of the stems being forked to engage the ends of the webs 43 of the shoes. Cup shaped members 45 overlie the ends of the pistons. When the pistons are retracted the bottoms of the cups 45 engage the ends of the cylinder parts 25 and 27 as well as the piston as shown by Figure 1. The walls of these cups 45 embrace the ends of the cylinder as shown. Nuts 47 are threaded on the stem. Rotation of the nuts serves to reciprocate the stems to determine the release position of the shoes and to correct the wear of the friction linings 19.

The pistons have opposed convex faces 51 engaged by diaphragms 53 of rubber and other like material which is incompressible but elastic. One diaphragm preferably engages the shoulder 55 between the two diameter parts of member 25. The marginal wall of the other diaphragm lies flat against the end of part 27. Since the diaphragms are bowed to the positions shown when the brake is released they are flattened in the act of spreading the shoes thereby tending to crowd the mass of the rubber and so to increase its efficiency. With such a sealing diaphragm it is not necessary to use parts of the wheel cylinder to grip the rubber at its periphery. A somewhat lighter pressure at the marginal wall is sufficient, this pressure being great enough to prevent leakage when the brake is released and this pressure adapted to be supplemented by the fluid pressure when the brakes are applied. To that end there are used cup shaped members 57 each having a radially extending marginal portion 59, an axially directed side wall 61 and a bottom portion 63 the latter being apertured as at 65 for the passage of the hydraulic fluid. The marginal portions 59 engage the rubber seals as shown. Between the two cups is a spider expander 67 (Figure 2). It has a central portion 69 and spring fingers 71 bent alternately in opposite directions, the fingers having axially directed ends 73. The alternate spring fingers engage the ends of the axial portions of the cups 57. The spider is placed between the cups 57 and its spring fingers are prestressed in the process of assembly and thereby the cups are pressed apart exerting a yielding pressure on the marginal portions of the rubber seals to prevent leakage. In use of the brake the movable column of fluid enters the cylinder through opening 75. The fluid under pressure pushes the bowed rubber diaphragms, the diaphragms being flattened push the pistons 33 and 37 and apply the shoes to the drum. At the same time the fluid under pressure supplements the spring pressure on the marginal walls of the diaphragms and holds the diaphragms firmly against their seats.

Figure 3:
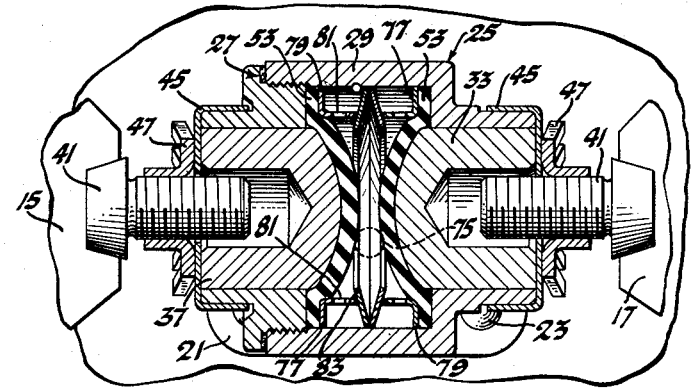
Figure 3 is a view like Figure 1 of a second form of the invention.
Figure 4:
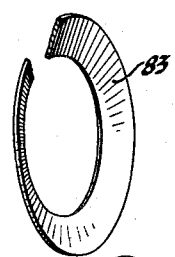
Figure 4 is a perspective of a part used in Figure 3.

In the second form of the invention shown by Figures 3 and 4 similar parts are given similar reference characters. The difference between Figure 3 and Figure 1 relates solely to the parts between the two diaphragms. There are used in this form stamped members 77 angular in cross section having radial flanges 79 engaging the marginal wall of the rubber seals and axially directed flanges 81. Between the opposed ends of the axial flanges 81 are spring plates 83. These plates are bowed into conical form. They are arranged in opposed relation contacting with each other at their outer edges adjacent the cylinder wall and are prestressed to engage the opposing edges of parts 81. The prestressed condition of these springs is sufficient to hold the rubber diaphragms sealed when the brake is released and the fluid under pressure returns from the wheel cylinder. When the brake is applied the fluid under pressure not only moves the shoes into engagement with the drum but exerts pressure upon the marginal walls of the rubber diaphragm as before described.

Figure 5:
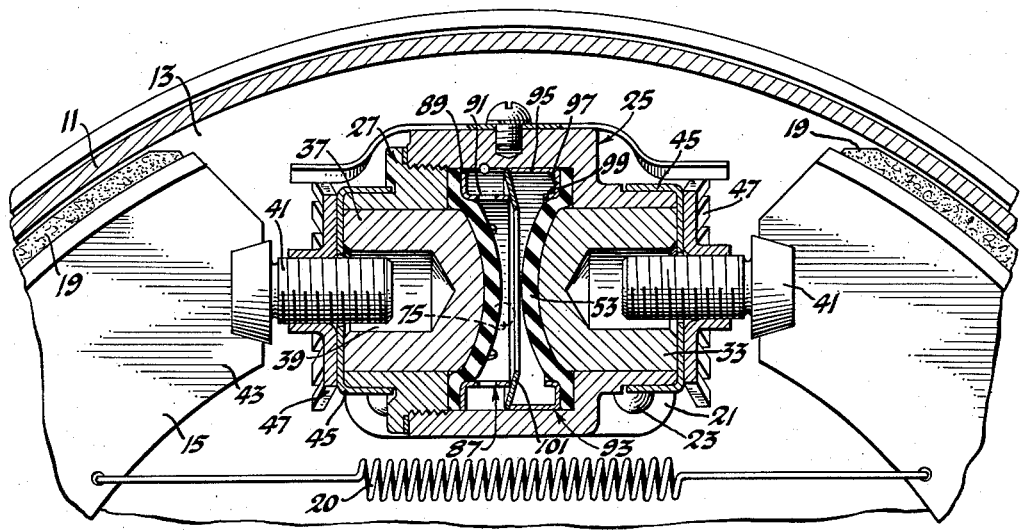
Figure 5 is a vertical section through a third embodiment.
Figure 6:
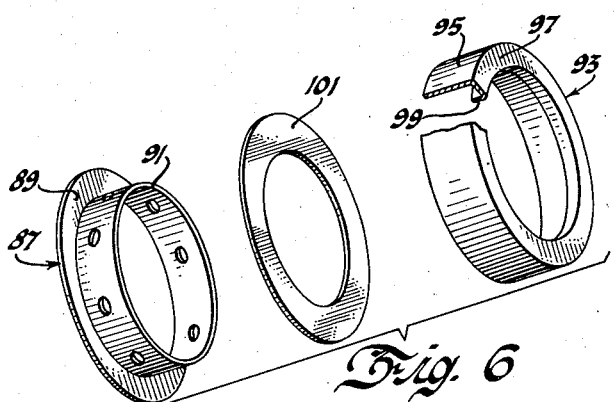
Figure 6 is a perspective of several parts used in the third form of the invention, the parts being shown in disassembled relation.

In Figure 5 also the only difference is in the parts located between the rubber diaphragms. In this form numeral 87 is a ring having a radial flange 89 for contact with the outer margin of the rubber seal and an axial flange 91 spaced from the cylinder wall and extending toward the center of the cylinder. A second ring 93 has an axial flange 95 in parallel with and in contact with the cylinder wall. A radial flange 97 is in contact with the second rubber diaphragm and a short axial flange 99 radially spaced from the flange 95 extends toward the center of the cylinder. A bowed spring plate 101 is prestressed to engage along its outer margin the flange 95 and near its inner margin it is in contact with flange 91. This spring plate is prestressed so that the margin of the rubber is held in anti-leak relation with the cylinder when the brake is released. When the brake is applied, fluid pressure flattens the diaphragms and supplements the seal.

Figure 7:
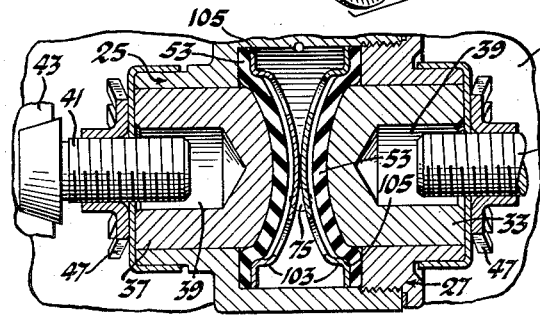
Figure 7 is a sectional view of still another embodiment.

In Figure 7 between the rubber diaphragms there are dome-shaped spring cups 103. The cups are assembled with the marginal radial flanges 105 seated against the marginal walls of the rubber diaphragms and with their domes in contact. When the end portion 27 is threaded into part 25 the domes are flattened with the result that a spring load is transmitted from the spring cups to the marginal wall of the rubber diaphragms and leakage is thereby prevented. The dome part of the cup remains in spaced relation from the dome portion of the rubber seal, the cup being apertured for the passage of the hydraulic fluid. The cups act as high rate springs and serve to accommodate any set which the rubber diaphragm may assume in service.

We claim:

1. A hydraulic motor comprising a cylinder having reduced ends forming internal shoulders, diaphragms of flexible incompressible material peripherally engaging said shoulders, pistons reciprocable within said ends in response to hydraulic pressure applied between and acting to move said diaphragms, bowed spring means between said diaphragms and operable to yieldingly urge their marginal portions against said shoulders, together with rings having radial flanges engaging said marginal portions of the diaphragms and opposed axial flanges, said spring means engaging said axial flanges.

2. A hydraulic motor comprising a cylinder having reduced ends forming internal shoulders, diaphragms of flexible incompressible material peripherally engaging said shoulders, pistons reciprocable within said ends in response to hydraulic pressure applied between and acting to move said diaphragms, bowed spring means between said diaphragms and operable to yieldingly urge their marginal portions against said shoulders, together with angular rings having radial flanges engaging the marginal portion of said diaphragms, opposed axial flanges and an apertured wall connecting the axial flange of each ring.

3. A hydraulic motor comprising a cylinder having reduced ends forming internal shoulders, diaphragms of flexible incompressible material peripherally engaging said shoulders, pistons reciprocable within said ends in response to hydraulic pressure applied between and acting to move said diaphragms, bowed spring means between said diaphragms and operable to yieldingly urge their marginal portions against said shoulders, together with angular rings having radial flanges engaging the marginal portions of said diaphragms and having opposed axial flanges, said spring means being a spring plate with oppositely bent spring tongues engaging the axial flanges of said rings.

4. A hydraulic motor comprising a cylinder having reduced ends forming internal shoulders, diaphragms of flexible incompressible material peripherally engaging said shoulders, pistons reciprocable within said ends in response to hydraulic pressure applied between and acting to move said diaphragms, bowed spring means between said diaphragms and operable to yieldingly urge their marginal portions against said shoulders, together with angular rings having radial flanges and engaging said diaphragms and opposed axial flanges, said spring means comprising opposed bowed or conically preformed annular discs peripherally in contact with each other and engaging under stress said axial flanges.

5. A hydraulic motor comprising a cylinder having reduced ends forming internal shoulders, diaphragms of flexible incompressible material peripherally engaging said shoulders, pistons reciprocable within said ends in response to hydraulic pressure applied between and acting to move said diaphragms, bowed spring means between said diaphragms and operable to yieldingly urge their marginal portions against said shoulders, together with angular rings having radial flanges engaging said diaphragms and also having opposed axial flanges, said axial flanges being radially spaced and said bowed spring means peripherally engaging the outer flange and also engaging the inner axial flange near its inner circular margin.

EARL R. PIERCE.
GILBERT K. HAUSE.